May 20, 1924.

W. H. BIRDSALL

MILKING MACHINE

Filed Jan. 11, 1921

WITNESSES

INVENTOR.
WILLIAM H. BIRDSALL
BY
his ATTORNEY

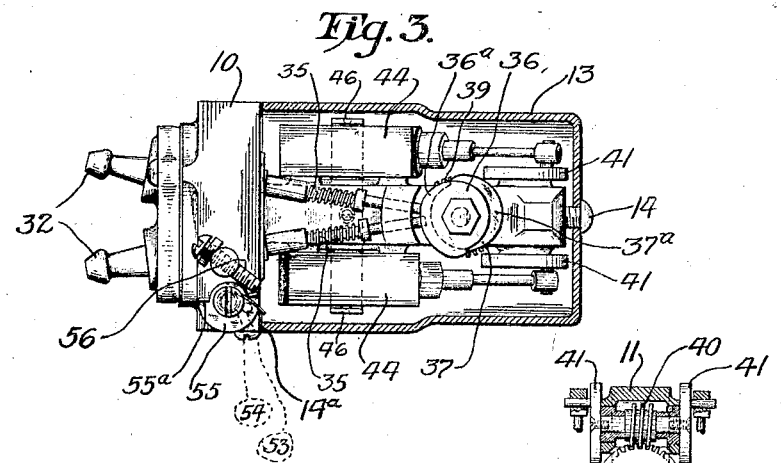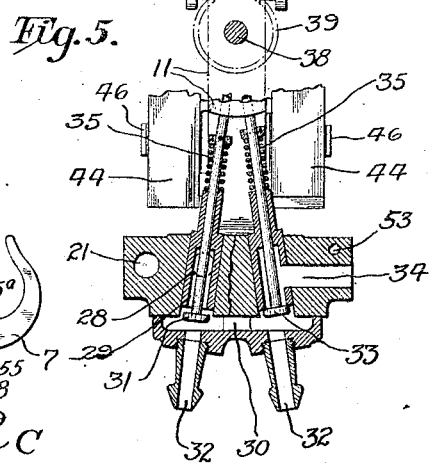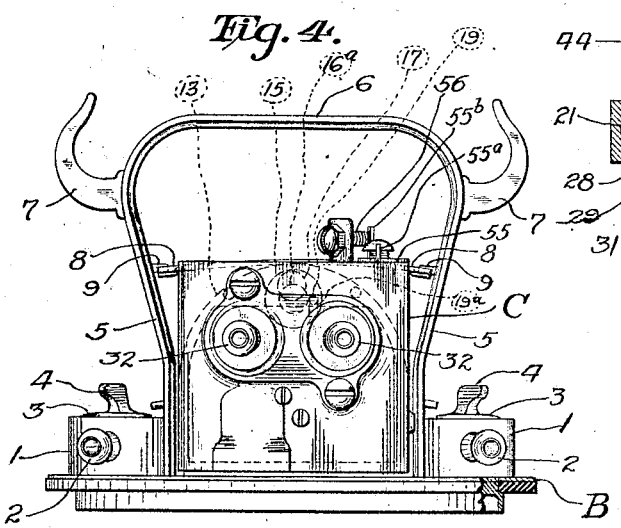

May 20, 1924.
W. H. BIRDSALL
MILKING MACHINE
Filed Jan. 11, 1921    3 Sheets-Sheet 3
1,494,577
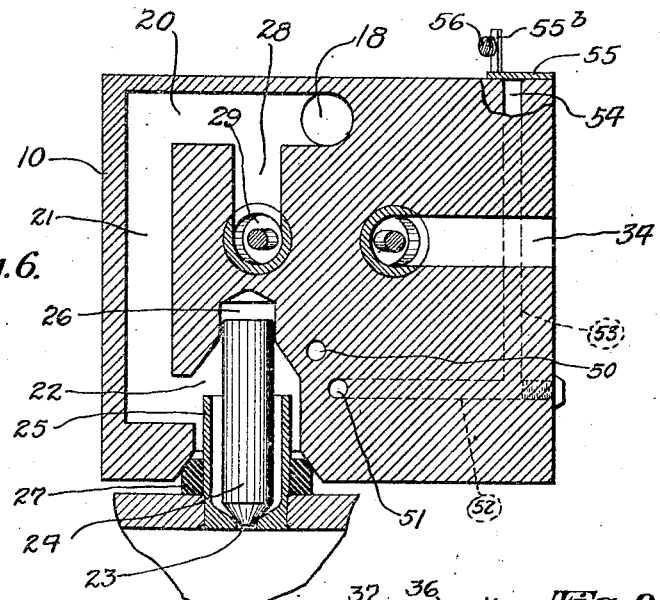
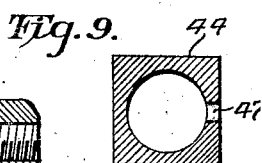
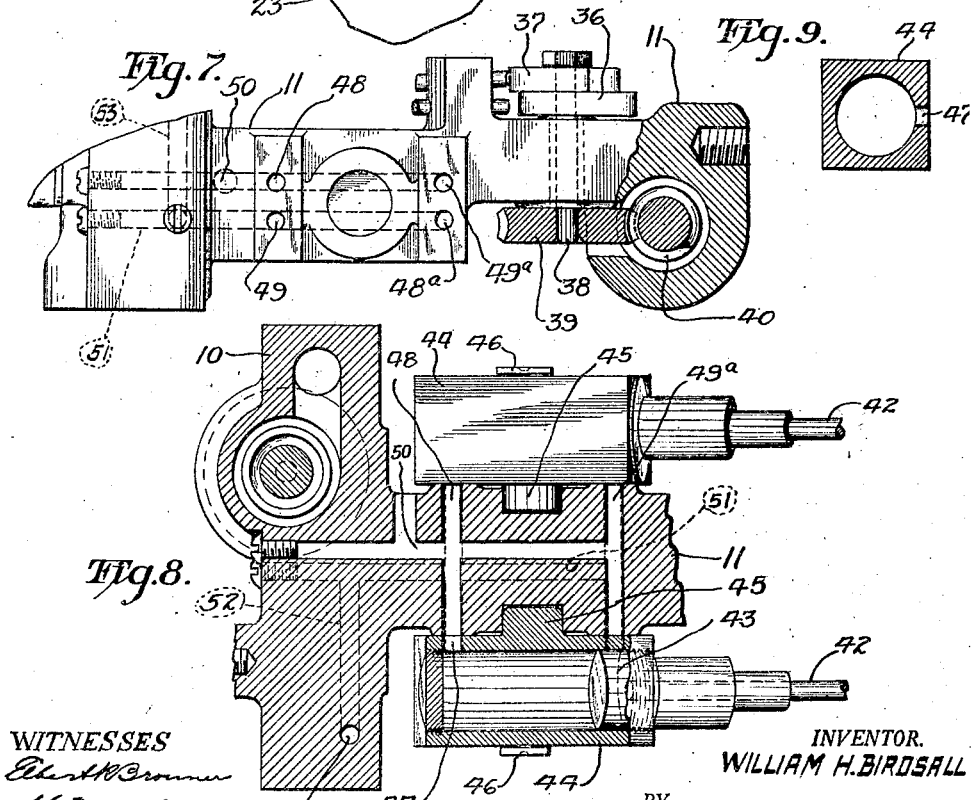
WITNESSES
INVENTOR.
WILLIAM H. BIRDSALL
BY
his ATTORNEY Patented May 20, 1924.

1,494,577

UNITED STATES PATENT OFFICE.

WILLIAM H. BIRDSALL, OF MONTCLAIR, NEW JERSEY, ASSIGNOR, BY MESNE ASSIGNMENTS, TO EMPIRE MILKING MACHINE COMPANY, OF BLOOMFIELD, NEW JERSEY, A CORPORATION OF NEW JERSEY.

MILKING MACHINE.

Application filed January 11, 1921. Serial No. 436,435.

*To all whom it may concern:*

Be it known that I, WILLIAM H. BIRDSALL, a citizen of the United States, residing in the city of Montclair, county of Essex, State of New Jersey, have invented certain new and useful Improvements in Milking Machines, of which the following is a specification, reference being had to the accompanying drawings, illustrative of one particular embodiment of my invention.

This invention relates to milking machines and more particularly to the types operated by suction and in which the operation is performed by a pulsation effected by alternate air pressure and release at teat-cups.

Features of this invention aim specially to provide the mechanism, usually supported in proximity to the cow, and preferably on the milk pail, and to provide such mechanism simple in construction, reliable as to operation, properly adjustable by any one familiar with milking and mechanically advantageous with respect to lubrication without in any way permitting ample lubricant from leakage or interference with the procuring and collecting of the milk.

Various features of my invention are embodied in a single structure shown in the accompanying drawings in which:

Fig. 3 is a plan view of the pulsator mechanism in part horizontal section.

Fig. 4 is an end elevation of the pulsator in place on the pail cover.

Fig. 5 is a fragmentary view in horizontal section, on the axis of the valves in part and with certain elements removed to illustrate underlying portions of the mechanism.

Fig. 6 is a transverse section of the end of the pulsator casing containing the valve ports and vacuum line leading to the vacuum valve on the pail cover, in enlarged scale.

Fig. 7 is a side view on an enlarged scale of the vacuum motor frame and driving gear supports.

Fig. 8 is a horizontal section, fragmentary, of the valve end of the pulsator casing and the integral engine frame and supports in fragment, with the vacuum motor cylinders in position.

Fig. 9 is a cross-section of one of the vacuum motor cylinders.

Figure 1:
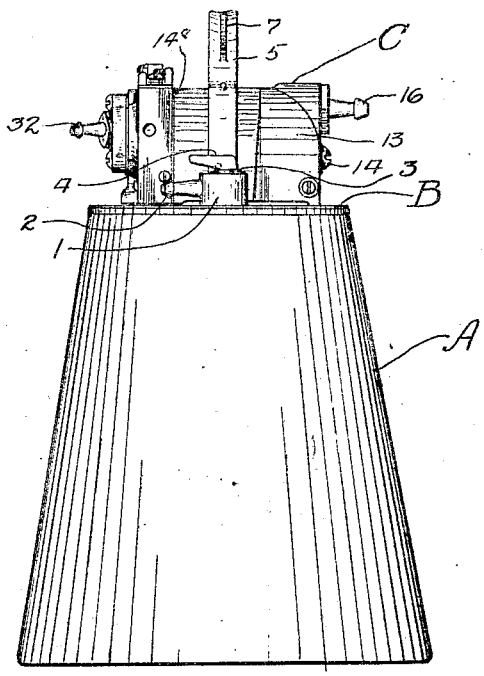
Fig. 1 is a side elevation of a milk pail with pulsator mechanism in position on its cover.

The milk pail A has the detachable cover B, on which the unit C rests and is connected as hereinafter more particularly set forth. This unit C comprises the pulsator and all mechanism necessary to effect the pulsating control at the teat cups, having in the unit the necessary ports for the vacuum line leading to the pail cover valve, and forming a unit casing with all the details of the mechanism self-contained and operable by the tube or pipe connections to nipples rigidly secured and forming the only projections for operating parts of the mechanism. The nipples likewise form the only openings into the casing, which otherwise is an oil-tight and air-tight casing, except for the necessary air inlet vents, thus preventing any leakage of oil from the mechanism on to the pail or in any way to parts through which the milk might be contaminated. As a result of the construction it is possible to amply lubricate the mechanical mechanism of the pulsator without the slightest chance of danger by leakage or otherwise, even when the milking machine is in the hands of most inexperienced people.

The pail cover has secured to it bosses 1—1 with nipples 2, and each has a valve 3 with valve handle 4. This provides for the milkway connection from the teat cup by attaching the milk tube to the nipple 2, so that the milk passes through the bosses 1—1 past the valve 3 when it is open, downward through a hole under each boss through the milk pail cover B into the pail A.

Secured to the pail cover are uprights 5—5 which extend upward and converge to form the handle 6 and may have the horns 7—7, which are used for convenience to support the tubes when transporting the milker. These uprights 5—5 are spaced so as to permit the passage of the casing unit C and prevent lateral displacement of the unit from its proper position on the pail cover, while also providing means of locating the casing unit when placing it in position. A clip plate 8 may for convenience, be sprung over the top of the casing C with its end under studs 9—9 on the uprights 5—5, thereby forming a very convenient and readily-removable clip as an additional means to keep the casing C in its operating position on the pail cover, although the airtight connection between the casing and the pail cover is established by the vacuum suction due to the particular coupling where the unit casing fits over the pail cover main valve, as hereinafter more particularly described.

The pulsator unit C comprises the port and valve block 10, which in the present form has an integral projection 11 supporting two air motors 12—12, this block with its projection being bored with suitable holes to form the vacuum ducts connecting with the engine and also connecting with the pulsator valves and connecting with the pail cover vacuum valve, all such ducts being "blind," that is embodied in the interior of the metal whereby protruding piping and connections are entirely eliminated. The other part of the pulsator unit is a casing 13, which is a complete casing with only one end open abutting the face of the block 10 and adapted to form a joint 14ª oil-tight and air-tight, when the casing 13 is pressed against the block 10 by means of screw 14 engaging the end of the casing and screwing into the end of the projection 11 constituting an integral portion of the block 10. This casing 13 has a thickened roof or upper portion, with a recess 15 into which the nipple 16 screws, and a port 17 having air connection with the bore 16ª of the nipple, thus forming a vacuum line port leading into the port 18 in the block 10. A separate smaller port 19 connects with the nipple 16 and provides means of suction from the interior of the casing through the tube 19ª in the roof of the interior, so that air may be drawn from the casing at its top and may include some oil vapor, but will not suck the oil out of the casing and interfere with the lubrication of the parts of the mechanism.

Figure 2:
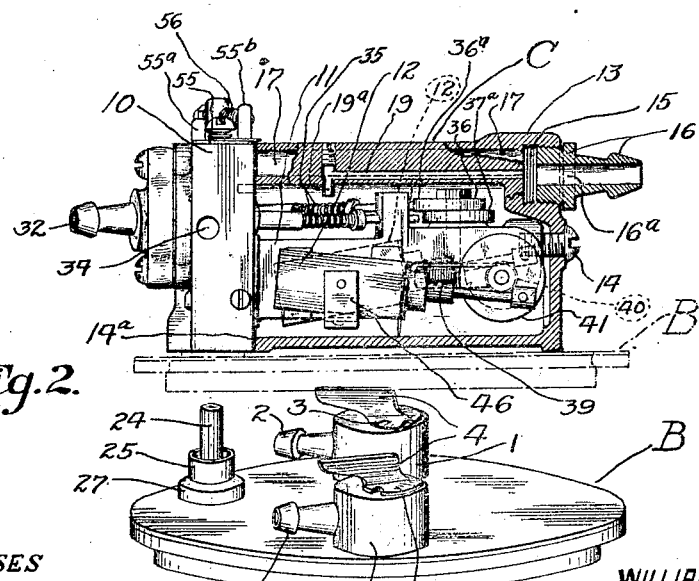
Fig. 2 is a view of the pail cover in perspective with the pulsator mechanism and vacuum line ports raised clear of the cover and shown in part vertical section, twice the scale of Fig 1.

The vacuum connections are effected by the main vacuum line being coupled to the nipple 16, thereby causing suction in the port 17 which connects with the port 18 in the block 10, and by ports 20—21 the vacuum becomes effective at the chamber or suction cup 22, which consists of a chamber opening from the bottom of the unit, namely formed in the bottom of the block 10. From the chamber 20 the connection to the pail is effected through the valve opening 23 controlled by the valve 24 which is surrounded by the sleeve 25, while the recess 26 in the block forms a guide for the upper end of the valve 24. The opening of the suction cup or chamber 22, in the form shown, is flared and engages the packing 27 which surrounds the junction of the sleeve 25 with the upper surface of the pail cover B. Thus, as shown in Fig. 2, the sleeve and packing or gasket are the only permanent parts of the pail cover, valve 24 being removable, or being held in position to prevent impurities from entering into the milk. Entirely apart from the pail cover and the packing or sleeve, the unit casing may be lifted off as shown in Fig. 2, without any disturbance of the rest of the connections and without the manipulation of any bolts, screws or nuts. When assembling for operation the unit casing is simply placed on the pail cover being centered or located for convenience by means of the uprights, but the suction cup cavity 22 can be very readily placed over the valve and sleeve of the pail cover, and the suction then locks the unit pulsator mechanism immediately into operative position.

Besides the vacuum port connection just described, the port 28 is formed in the block 10 leading to the valve space 29, so that the vacuum becomes effective in the chamber 30 depending upon the control of the valve 31, thereby producing vacuum at the nipples 32—32. However, when the valve 31 is closed the valve 33 is opened and connection established between the chamber 30 and the port 34 which admits outside air, thereby establishing atmospheric air pressure in the chamber 30 and at the nipples 32—32, thus the vacuum pulsator tubes being attached to nipples 32—32, each leading to the sleeve of a teat cup, or to the manifolds operating a plurality of teat cups, provide the release of vacuum in order to give the alternate pressure and release constituting the pulsating action of the teat cups.

The valves 31 and 33 are operated by their stems which by springs 35—35 acting in the usual manner against collars on valve stems, tend to draw the valves on to their seats,—in other words to close the valves normally. This causes quick closing of the valves as soon as the end of the valve stem is released from the cam dwell, which in the case of valve 31 is the dwell 36ª on the cam 36, and the operation of valve 33 is effected by the dwell 37ª on cam 37. These cams are rotated by the shaft 38 actuated by worm gear 39, turned by worm gear 40 actuated by the crank discs 41—41 which are operated by the piston rods 42 and pistons 43 moving in the cylinders 44 which are operated by air. These two vacuum motors each have a pivot boss 45 and a spring clip 46 holds the cylinders against the block projection 11, so that the ports 47 at either end of each of the cylinders will alternately register with the air ports 48—48$^a$ and 49—49$^a$. Registering with ports 48—49$^a$ provides an air connection with the outlet 50 into the interior of the casing, where the air is rarefied due to the vacuum connection effected through the pipe 19$^a$ which leads to the main vacuum line. The vacuum motor port connections through 49 and 48$^a$ establish through a port 51 in the block 10 and ports 52—53, a connection to the atmospheric pressure or the outside air and orifice 54 which is controlled by valve 55. This valve 55 is spring pressed in one direction as shown, by a coil spring under the valve plate pivot screw, while adjacent to the valve plate is a post and set screw 56 which may be adjusted so as to limit the movement of the plate 55, to definitely adjust the opening and, therefore, the entry of air to the orifice 54, so that the vacuum motors in the interior are controlled by the regulation of the air inlet. When once adjusted by the set screw 56 it sometimes becomes desirable to admit more air and speed up the engines to clear the mechanism, as, for instance, when starting, and this is accomplished by pressing the flange 55$^a$ on the valve plate to open wide the orifice 54, then releasing it and the spring brings the valve plate 55 back to its set position definitely adjusted by the screw 56 which engages stop 55$^b$ on the valve plate.

It will thus be seen that a completely enclosed unit casing is provided, without any projections except the nipples for the air or vacuum piping or tubing, while such casing encloses completely the driving mechanism to regulate the valves which cause the pulsations in the vacuum line leading to the teat cups. This mechanism, in order to be thoroughly reliable, and in order that it operates with efficiency and economy should have ample lubrication, and by the complete enclosure of the mechanism and all of the necessary moving parts, they can in this arrangement be thoroughly lubricated without the slightest danger of leakage of any amount of oil, that is to say any leakage which would be detrimental to the operating of the milking machine. Furthermore, all of the ports and vacuum, as well as air ducts and connections are so formed within the metal of the casing, that no joints are pressed liable to leakage, and no fittings, couplings or other parts are involved, which would tend to leakage or be liable to breakage or which would otherwise provide inconveniences in connection with the operation or the maintenance of the milking machine.

It will be seen that the operation is effected by connecting the main vacuum line to the nipple 16, and the suction thus created through the chamber 15, the port 17 and ports 18, 20, 21 and 22 within the solid block end 10 of the casing, immediately establish the suction connection to the valve in the pail cover, thus creating vacuum in the milk pail, which on opening the valve 4 causes the vacuum to operate through the nipple 2 and through the milkway in order to draw milk from the teat cup.

The simultaneous operation involves suction from the main line becoming effective through the ports 19 and 19$^a$, so as to cause a partial vacuum in the interior of the casing, thus creating suction at the port 50, which through the motor ports cause vacuum behind the respective pistons and driving the pistons oscillates the cylinders, and with the oscillation the air vent properly controlled at 54 determines the speed of operation of the vacuum motors and, therefore, the rate at which the cranks 41—41 are turned and consequently the movement of the worm gear and the cams 36—37 which actuate the pulsation control valves 31—33.

Simultaneously in the operation the vacuum from the main line acts through port 18 and port 28 around the valve stem and through the opening controlled by valve 31 into the chamber 30, thereby establishing vacuum through the vacuum pipes attached to nipples 32—32, and consequently at the envelope of the teat cup. This vacuum at the teat cups is abruptly broken when the cam 37 releases the valve stem and allows the spring 35 to quickly close the valve, while the other cam actuates valve 33 and permits air to enter through port 34 into the port chamber 30, thereby releasing the vacuum at the teat cup envelopes in view of the connection between nipples 32—32 through the pulsator tubes.

The entire mechanism, furthermore, may be readily inspected by removing the screw 14 which permits the withdrawal of the casing 13, and provides direct accessibility to the valve stems, cams, vacuum motors, gears and all moving parts of the device. Oil can then be poured into the casing from the open end and the mechanism pushed into the casing until the open end of the casing abuts the block 10, with preferably a gasket at the joint 14$^a$, whereupon the securing by the screw 14 presses the entire casing against the block making the joint 14$^a$ tight, but also simultaneously establishing the airtight connection from the port in the top of the casing 13, that is the master port, with the ports or passages in the block 10 which are immediately in condition for proper operation of the entire mechanism. The ports for the motor operation being permanently established in the metal of the block 10 and its projection 11, and which become operative as soon as the vacuum line becomes effectively connected to the interior chamber through port 19ª, causing a suction at port 50 to start operation of the motor,—provided the orifice 54 is opened by proper adjustment of the plate 55. With the main line suction connection on nipple 16, and air orifice 54 open, the pneumatic motor will start to operate, and to insure starting under all conditions the relative position of the piston rod connection to crank discs 41—41 is made as shown, or in other accepted relations to avoid dead-centre. The connecting rods or crank discs will throw oil so that other parts are amply lubricated. Even with a small supply in the casing, the entire unit can be shaken so that the oil will be spread over the gears, cams and valve stems, affording certainty of proper oiling without any chance of leakage on to the milk pail cover or permitting it in any way to reach the milkway or the vacuum port in the cover.

When the motor is running steady the set screw 56 can be adjusted so as to determine the closing limit of plate 55, that is the motor can be throttled down or its speed increased until by timing or instinct due to experience the dairyman sets the proper speed of the motor and therefor the pulsations to suit the cow or cows for which the machine is intended. Thereafter the helper actually handling the machines has no occasion to make any refined adjustment or any manipulation whatsoever which would interfere with the proper functioning of a machine,—but when setting the machine for starting anyone can press the adjusting clip 55ª to open wide the orifice 54, thereby temporarily allowing the motor to speed up and to insure a clearing of the ports preliminary to the actual milking, or this may be done at any time if unexpected irregularity should occur. But the moment the finger is taken off the clip 55ª, the spring returns the plate 55 to the limit of its closed position determined by set screw 56. With the gear reduction beteen the worm 40 and the wormwheel 39, a change in the vacuum pressure in the main line, affecting slightly the speed of the motor, will cause only a relative fraction of change in the speed of rotation of the cams 36—37, thereby insuring substantially uniform rate of pulsations through the pipe connection from nipples 32—32; but the spring on each of the valve stems will cause their uniformly quick seating after they have passed the dwell on the cams, so that the speed of change from pressure to vacuum at the teat cup envelopes will be uniform irrespective of slight changes in the rate of pulsations.

It will be seen that should any moisture or foreign matter collect in the main connection leading from nipple 16 to the main vacuum line, due to temperature conditions or otherwise, any tendency to back-flow would cause moisture or foreign matter to settle in the bottom of the chamber 15. If this bottom of this chamber 15 should be filled so that any return-flow of air through the ports could affect it, then in the form shown such condensation would be carried through the port 19 and the opening 19ª and would drip into the airtight and oiltight interior space of the casing where it could do no harm, and in any event could not reach the milk pail valve or the milk. Even any slight excess that might be carried back through port 17 would drip into the port 28 surrounding the valve and thereby accumulate in a harmless place. If desired, the chamber 15 can be suitably enlarged to accommodate at the bottom any possible accumulation that could be anticipated as a return-flow of sediment or moisture, and where conditions of condensation or other factors might make it desirable a vent can be made in the bottom of this chamber 15 to the outside of the casing, with a closure to hold air, and when desired to drain off any impurities, which otherwise would be cleaned out by removing the nipple 16. Such vent can be supplied with a one-way closure permitting any accumulation to flow out in the event of break of vacuum connection, and flowing out on to the pail cover remote from any point of ingress to the pail, it can be disposed of without the chance of milk contamination.

While the casing C fits readily between the uprights forming the supports for the handle 6, any suitable spring clip connection can be made to insure its reasonably rigid positioning, while I prefer such a spring clip as 8, which permits the casing C to find its seat in perfect registration with the gasket 27, and then simply forms a locking against accidental removal.

In the actual use of this milker, the parts are reduced to the simplicity of the pail with its cover and handle, and one other piece, namely, the unit containing all of the mechanism and the ports. The cover being pressed in position the unit, in fact any one of a number at the dairy is set in position, the main vacuum line hose connected to the nipple, and the teat cup vacuum pipes connected to their nipples, and the milkway tubes connected to the cover nipples,—then turning on the vacuum immediately locks the airtight connection and puts the mechanism into operation without the necessity of any adjustments, regulation or tightening of screws or nuts. On the other hand, any possible trouble with the mechanism simply means the substitution of another unit, entirely interchangeable, and the displaced unit can be opened up by any one familiar with mechanism and can be oiled, inspected or repaired with convenience on account of the ready accessibility to all the parts.

While many variations may be made in details of construction of my milker, and dimensions and arrangement may be varied, and certain of the features of my invention may be used without combining them with others,—what I claim and desire to secure by Letters Patent is:

1. A milking machine comprising a milk receptacle and a plain top or cover therefor held thereto by suction, a separable mechanism casing adapted to be seated on said cover and secured thereto without separate parts, a vacuum line nipple connection at one part of said casing and suction ports through said casing and a vacuum line coupling in another part of said casing cooperating with a vent in said cover, teat pulsating mechanism in said casing comprising a valve and a motor, an oil-tight chamber enclosing said motor and a port integral with said casing connecting the roof of said chamber with the vacuum line nipple.

2. In a milking machine, a milk receptacle and a plain vacuum-held cover therefor, a vacuum vent through said cover and a separable casing resting on said cover and registering with said vent, ports formed in the integral parts of said casing, an oil-tight chamber formed in said casing and moving port mechanism in said chamber adapted to be lubricated by an oil bath within the chamber, a vacuum port connection leading from said chamber and of relatively smaller size than the main line vacuum port leading from the milk pail to a main vacuum line and a controlled air inlet vent for said enclosed chamber.

3. In a milking machine, a teat pulsator mechanism comprising a unit casing adapted to be affixed to the milk receptacle, a connection from said casing to draw air from the milk receptacle, a second connection to create vacuum in a pulsator line, a vacuum motor within said casing and a vacuum port leading from said motor, and a single outlet from said casing with port connections to create vacuum at the three aforementioned vacuum inlets.

4. A pulsator for milking machines comprising a unit casing having a connection for a main vacuum line, and having a pulsator pipe connection to a teat cup, ports in said casing establishing vacuum connections to a vent in the milk receptacle, and a vacuum motor within said casing, an air-tight oil chamber within said casing and air inlet to the motor in said casing and an air outlet from the upper part of the airtight casing to the main vacuum line connection, an adjustable valve for said air inlet to the motor and means for setting said adjustment for a closing limit.

5. A milking machine comprising a milk receptacle and a pulsator mechanism adapted to be held thereon, main line vacuum connection from said pulsator mechanism and a casing therefor comprising ports and an airtight chamber surrounding the pulsator mechanism and having a single vacuum line connection and a controlled air inlet vent, airtight valve stem holes from said chamber and valves controlled thereby and a port surrounding said valves formed as a rigid part of said casing and having a pulsator pipe connection for the vacuum line to a teat cup.

6. In a milking machine, a milk receptacle and a pulsator mechanism adapted to operate in conjunction therewith, an air motor in said pulsator mechanism and an airtight chamber enclosing the same, an adjustable vent to admit air to said chamber and a port leading from said chamber to a vacuum line connection from the mechanism unit, a cam within said casing operated by said motor and a valve stem actuated thereby in one direction, independent quick-return means for operating said valve stem in the opposite direction, a valve operating thereby outside of said air chamber and controlling a direct main line vacuum connection port in the passage to the teat cup vacuum tube.

7. In a milking machine pulsator comprising a unit having a main line vacuum coupling, and having two other vacuum connections with ports intermediate said connections and the coupling and an integral port in said casing adapted to create vacuum at a pneumatic motor, an outside air connection and port integral in said unit casing to supply air to said motor and a self-closing valve for said outside air connection and means for opening said valve in excess of the adjusted limit without variation of the degree of adjustment.

8. In a milker, a detachable self-contained unit casing having an exterior main vacuum line coupling at one portion and a plurality of teat cup pulsator tube couplings at another portion, a unit member of said casing containing all of the intermediate valve chambers and air ports and valves to control the pulsations supported in said unit member and completely enclosed therewith including self-contained valve operating mechanism.

In testimony whereof, I have signed my name to this application, in the presence of two subscribing witnesses, this 30 day of December, 1920.

WILLIAM H. BIRDSALL.

Witnesses:
L. S. SAWYER,
WM. C. BLACKHAM.